No. 805,491. PATENTED NOV. 28, 1905.
R. A. SEDLACEK.
FLOWER POT.
APPLICATION FILED JULY 10, 1905.
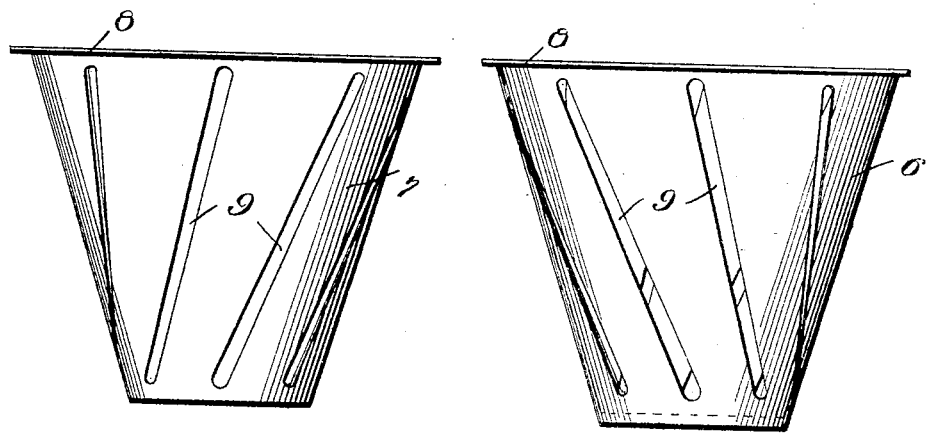
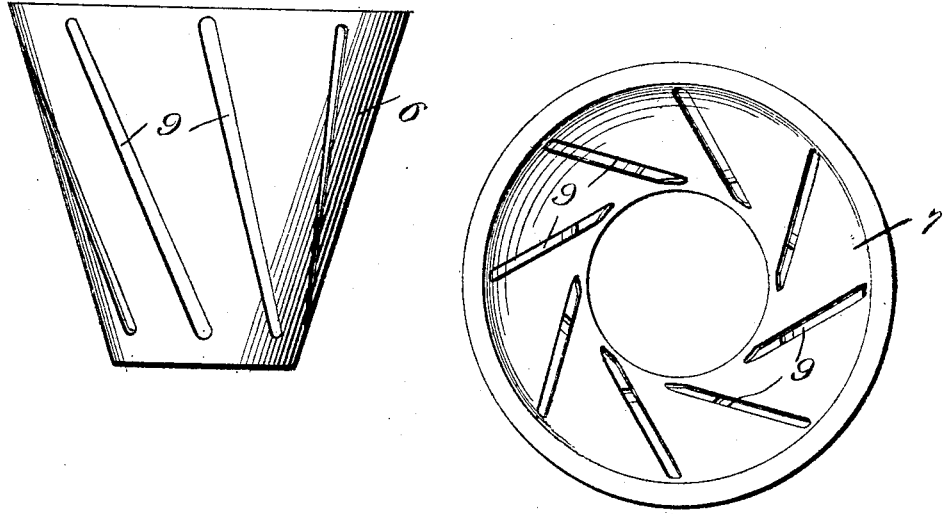
WITNESSES:
INVENTOR
Rudolph A. Sedlacek
BY Milo B. Stevens & Co.
Attorney

UNITED STATES PATENT OFFICE.

RUDOLPH A. SEDLACEK, OF GLENCOE, ILLINOIS.

FLOWER-POT.

No. 805,491. Specification of Letters Patent. Patented Nov. 28, 1905.

Application filed July 10, 1905. Serial No. 269,021.

*To all whom it may concern:*

Be it known that I, RUDOLPH A. SEDLACEK, a citizen of the United States, residing at Glencoe, in the county of Cook and State of Illinois, have invented new and useful Improvements in Flower-Pots, of which the following is a specification.

This invention relates to flower-pots, and is adapted particularly for use in lawns; and its object is to provide means whereby plants can be set out in lawns without injury in the mowing of the grass by the provision of means whereby the plants can be readily removed during the mowing operation.

In the accompanying drawings, Figure 1 is a side elevation of the flower-pot with the two parts separated. Fig. 2 is a side elevation with the parts together. Fig. 3 is a top plan view.

The pot is formed double, or in two sections, one of which fits within the other. It is preferably made of sheet metal, but may be made of any other material desired. The outer section is indicated at 6 of the usual flower-pot shape, and it may be open or closed at the bottom. It is shown open. The inner section is indicated at 7, similar in shape to the outer section and made of similar material. It is a little smaller in size, so that it will fit within the outer section, and it has at the top a rim 8 to give a neat appearance and to cover the edge of the outer section. Each section of the pot has in its side wall a series of slots 9, which are inclined at an angle to the axis of the pot. In one section the slots are inclined one way, and in the other section the slots are inclined the opposite way, and the extent of the inclination is such that the slots of the respective sections will cross each other in any or all positions in which the pots are placed—that is, the slots will cross so that openings will be formed in the wall of the pot, and these openings are for the purpose of admitting the moisture from the ground into the pot which will contain the plant.

In use the outer section of the pot is sunk in the ground until its upper edge is slightly below the surface. The inner section of the pot contains the plant and may be put in or lifted out whenever desired. When the lawn is to be mowed, the inner pot and plant therein are removed. A lawn-mower can then be run over the lawn without danger of injuring any of the plants, since it may pass completely over the outer section, which is sunk into the ground. After the lawn is mowed the plants are put back.

What I claim as new, and desire to secure by Letters Patent, is—

1. A flower-pot consisting of two pots one of which fits within the other and is removable therefrom, said pots having registering openings in the walls thereof.

2. A flower-pot consisting of two pots one of which fits within the other and is removable therefrom, said pots having, respectively, oppositely-inclined slots in the walls thereof, which slots cross each other when the pots are together.

In testimony whereof I have signed my name to this specification in the presence of two subscribing witnesses.

RUDOLPH A. SEDLACEK.

Witnesses:
SIGNA FELTSKOG,
H. G. BATCHELOR.